United States Patent
Fujisawa et al.

(10) Patent No.: US 7,622,065 B2
(45) Date of Patent: Nov. 24, 2009

(54) METHOD FOR THE PRODUCTION OF GOLF BALL

(75) Inventors: Koichi Fujisawa, Kobe (JP); Kazuhiko Isogawa, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 882 days.

(21) Appl. No.: 11/157,808

(22) Filed: Jun. 22, 2005

(65) Prior Publication Data

US 2006/0022382 A1 Feb. 2, 2006

(30) Foreign Application Priority Data

Jul. 30, 2004 (JP) ............................. 2004-224296

(51) Int. Cl.
*B29C 45/14* (2006.01)
(52) U.S. Cl. ................ 264/255; 264/279.1; 264/328.17
(58) Field of Classification Search ............... None
See application file for complete search history.

(56) References Cited

U.S. PATENT DOCUMENTS 5,824,258 A  10/1998  Yamaguchi

FOREIGN PATENT DOCUMENTS

JP  2004-209071 A  7/2004

*Primary Examiner*—Edmund H. Lee
(74) *Attorney, Agent, or Firm*—Birch, Stewart, Kolasch & Birch, LLP

(57) ABSTRACT

Mold 12 has an upper mold half 14 and a lower mold half 16. Pellet 34 obtained by cutting a resin composition into a predetermined size is placed into the mold 12. One pellet 34 is put on one recessed part 24. The pellet 34 has an incipient fluidization temperature T of 50° C. or greater and 150° C. or less. Weight of the pellet 34 is 1.4 g or greater and 2.0 g or less. Through clamping, the pellet 34 is compressed, and heated to allow the resin composition to flow thereby forming a preforming material. Difference (Tp−T) between the molding temperature Tp and the incipient fluidization temperature T is equal to or less than 70° C. Percent Pp of change in the weight average molecular weight Mp of the preforming material to the weight average molecular weight M of the pellet 34 is equal to or greater than −30%. Cover is formed with this preforming material. Percent Pc of change in the weight average molecular weight Mc of the cover to the weight average molecular weight M of the pellet 34 is equal to or greater than −30%.

16 Claims, 4 Drawing Sheets

METHOD FOR THE PRODUCTION OF GOLF BALL

This application claims priority on Patent Application No. 2004-224296 filed in JAPAN on Jul. 30, 2004, the entire contents of which are hereby incorporated by reference.

BACKGROUND OF THE INVENTION

1. Field of the Invention

The present invention relates to methods for the production of golf balls. More particularly, the present invention relates to methods for the production of a golf ball having a core and a cover comprising a thermoplastic resin composition.

2. Description of the Related Art

General golf balls have a core and a cover which covers the surface of this core. The cover usually comprises a thermoplastic resin composition. Injection molding or compression molding has been employed for formation of the cover.

Upon the injection molding, a resin composition is melted by heating in an injection molding machine. The melted resin composition passes a screw of the injection molding machine, and is injected toward a mold. The resin composition passes through a runner and a gate of the mold, and flows into a cavity at high speed. Thus entered resin composition is solidified to give a cover. For executing smooth inflow, the resin composition must have a low viscosity. Low viscosity can be achieved by elevating the temperature of the resin composition.

In recent years, covers of golf balls tend to be thin. Thin covers are accompanied by difficulty in formation. Various proposals in which improvement of formability in injection molding is intended have been made. U.S. Pat. No. 5,824,258 discloses a method of the production in which a mold having 10 or more gates is used.

In compression molding, the core is covered by two pieces of preforming material which comprises a thermoplastic resin composition and has a half shell shape. This core and the preforming material are placed into a mold. By clamping the mold, the preforming material is compressed. Concomitantly, the preforming material is heated. The compression and heating results in flow of the resin composition to form a cover. Also in formation of the preforming material, compression molding or injection molding has been employed.

Covers obtained by injection molding are inferior in abrasion resistance and scuff resistance. Upon hitting of the golf ball with a short iron, the cover tends to get scratched. In particular, this tendency is marked in covers having a thickness of less than 1.0 mm. Covers obtained by compression molding are more excellent in abrasion resistance and scuff resistance compared to the covers obtained by injection molding, although the level thereof is not satisfactory. An object of the present invention is to provide golf balls that are excellent in abrasion resistance and scuff resistance.

SUMMARY OF THE INVENTION

The method of the production of a golf ball according to the present invention comprises:

(1) a step of preparing a resin composition comprising a thermoplastic resin as a base polymer to obtain a material; and (2) a step of covering around a spherical core with this resin composition while allowing this resin composition to flow in a mold to form a cover having a percent Pc of change in molecular with respect to the material of equal to or greater than −30%.

Preferably, the material obtained in the aforementioned step (1) has an incipient fluidization temperature of 50° C. or greater and 150° C. or less. Preferably, the cover is formed by compression molding. Molding temperature in the compression molding is set to fall within the range of −20° C. or greater and +70° C. or less than the incipient fluidization temperature of the material. Molding time period of the compression molding may be 1 minute or longer and 30 minutes or less.

Another method of the production according to the present invention comprises:

(1) a step of preparing a resin composition comprising a thermoplastic resin as a base polymer to obtain a material;

(2) a step of forming a preforming material having a percent Pp of change in molecular weight with respect to the material of equal to or greater than −30%, while allowing this resin composition to flow in a first mold;

(3) a step of placing this preforming material and a spherical core into a second mold; and (4) a step of covering around the core with this resin composition while allowing the resin composition of this preforming material to flow in the second mold to form a cover.

Preferably, the material obtained in the aforementioned step (1) has an incipient fluidization temperature of 50° C. or greater and 150° C. or less. Preferably, the preforming material is formed by compression molding. Molding temperature in the compression molding is set to fall within the range of −20° C. or greater and +70° C. or less than the incipient fluidization temperature of the material. Molding time period of the compression molding may be 1 minute or longer and 30 minutes or less. Preferably, the material obtained in the aforementioned step (1) is in a pellet form. One pellet has a weight of 1.4 g or greater and 2.0 g or less. Preferably, the cover has a percent Pc of change in molecular weight of equal to or greater than −30%.

As a result of elaborate investigations by the present inventor, it was ascertained that exposure of the resin composition to a high temperature in the step of forming a cover or a preforming material causes cleavage and dissociation of a molecular chain of the base polymer, and that this cleavage and dissociation of a molecular chain adversely affects abrasion resistance and scuff resistance of the cover. Accordingly, the present invention was accomplished. In the method of the production according to the present invention, the percent Pp of change in molecular weight or the percent Pc of change in molecular weight is equal to or greater than −30%. Therefore, the cover comprises a base polymer having a great average molecular weight. The golf ball obtained by this method of the production is excellent in abrasion resistance and scuff resistance.

DESCRIPTION OF THE PREFERRED EMBODIMENTS

The present invention is hereinafter described in detail with appropriate references to the accompanying drawing according to the preferred embodiments.

Figure 1:
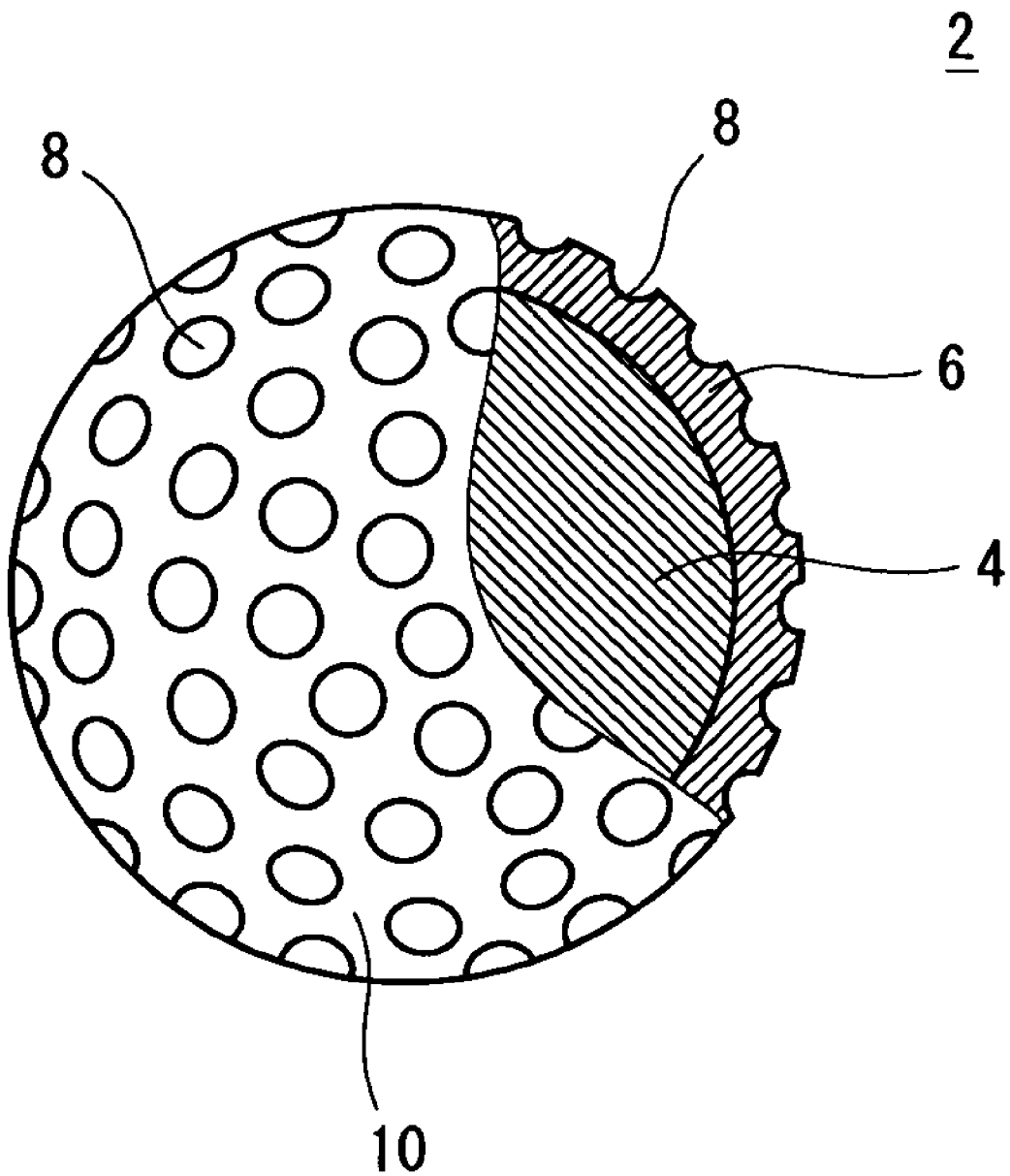
FIG. 1 is a cross-sectional view illustrating a golf ball obtained by the method of the production according to one embodiment of the present invention.

A golf ball 2 depicted in FIG. 1 has a spherical core 4 and a cover 6. Numerous dimples 8 are formed on the surface of the cover 6. Of the surface of the golf ball 2, a part except for the dimples 8 is a land 10. Although this golf ball 2 has a paint layer and a mark layer to the external side of the cover 6, these layers are not shown in the Figure.

This golf ball 2 has a diameter of from 40 mm to 45 mm. From the standpoint of conformity to a rule defined by United States Golf Association (USGA), the diameter is preferably equal to or greater than 42.67 mm. In light of suppression of the air resistance, the diameter is preferably equal to or less than 44 mm, and more preferably equal to or less than 42.80 mm. Weight of this golf ball 2 is 40 g or greater and 50 g or less. In light of attainment of great inertia, the weight is preferably equal to or greater than 44 g, and particularly preferably equal to or greater than 45.00 g. From the standpoint of conformity to a rule defined by USGA, the weight is preferably equal to or less than 45.93 g.

The core 4 is obtained through crosslinking of a rubber composition. Typically, polybutadiene may be used in the core 4. Also, the core 4 may have two or more layers. Whole or a part of the core 4 may be may be formed with a resin composition.

The cover 6 comprises a thermoplastic resin composition. Illustrative examples of the base polymer of the cover 6 include thermoplastic polyurethane elastomers, thermoplastic polyamide elastomers, thermoplastic styrene elastomers, thermoplastic polyester elastomers, thermoplastic polyolefin elastomers and ionomer resins. In light of the scuff resistance, a thermoplastic polyurethane elastomer is preferred. Two or more polymers may be used in combination. When a thermoplastic polyurethane elastomer and other polymer are used in combination, proportion of the thermoplastic polyurethane elastomer occupying in the total base polymer is preferably equal to or greater than 50% by weight, and more preferably equal to or greater than 80% by weight.

The thermoplastic polyurethane elastomer includes a polyurethane component as a hard segment, and a polyester component or a polyether component as a soft segment. Illustrative examples of the curing agent for the polyurethane component include alicyclic diisocyanate, aromatic diisocyanate and aliphatic diisocyanate. In particular, alicyclic diisocyanate is preferred. Because the alicyclic diisocyanate has no double bond in the main chain, yellowing of the cover 6 can be suppressed. Additionally, because the alicyclic diisocyanate is excellent in strength, the cover 6 can be prevented from being scuffed.

Illustrative examples of the alicyclic diisocyanate include 4,4'-dicyclohexylmethane diisocyanate ($H_{12}MDI$), 1,3-bis(isocyanatomethyl)cyclohexane ($H_6XDI$), isophorone diisocyanate (IPDI) and trans-1,4-cyclohexane diisocyanate (CHDI). In light of versatility and processability, $H_{12}MDI$ is preferred.

Specific examples of the thermoplastic polyurethane elastomer include trade name "Elastolan XNY90A", trade name "Elastolan XNY97A", trade name "Elastolan XNY585" and trade name "Elastolan XKP016N", available from BASF Japan Ltd.; and trade name "Rezamin P4585LS" and trade name "Rezamin PS62490", available from Dainichiseika Color & Chemicals Mfg. Co., Ltd.

Figure 2:
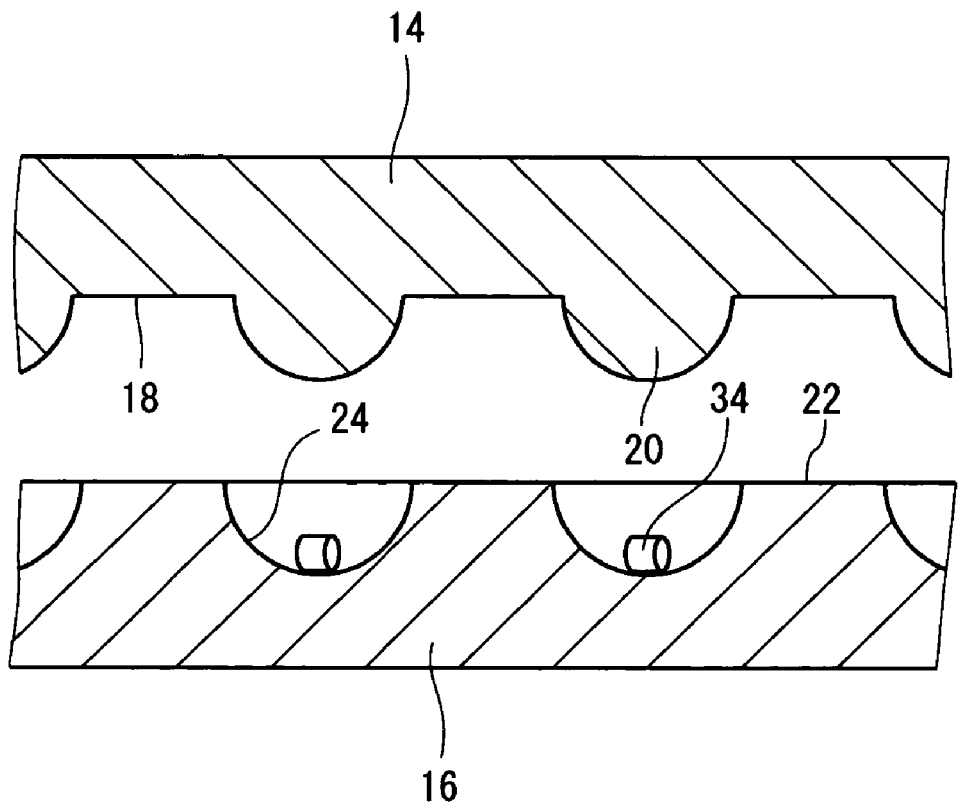
FIG. 2 is a cross-sectional view illustrating a part of the first mold used in the method of the production of the golf ball shown in FIG. 1.

FIG. 2 is a cross sectional view illustrating a part of a first mold 12 for use in the production of the golf ball 2 shown in FIG. 1. The first mold 12 has an upper mold half 14 and a lower mold half 16. The upper mold half 14 has a flat part 18 and a protruding part 20. The surface of the protruding part 20 has a shape that is substantially hemispherical. The lower mold half 16 has a flat part 22 and a recessed part 24. The surface of the recessed part 24 has a shape that is substantially hemispherical. The protruding part 20 has a radius that is smaller than the radius of the recessed part 24. When the upper mold half 14 and the lower mold half 16 are mated, a space is formed between the protruding part 20 and the recessed part 24. When the upper mold half 14 and the lower mold half 16 are mated, a space is also formed between the flat part 18 of the upper mold half 14 and the flat part 22 of the lower mold half 16.

Figure 3:
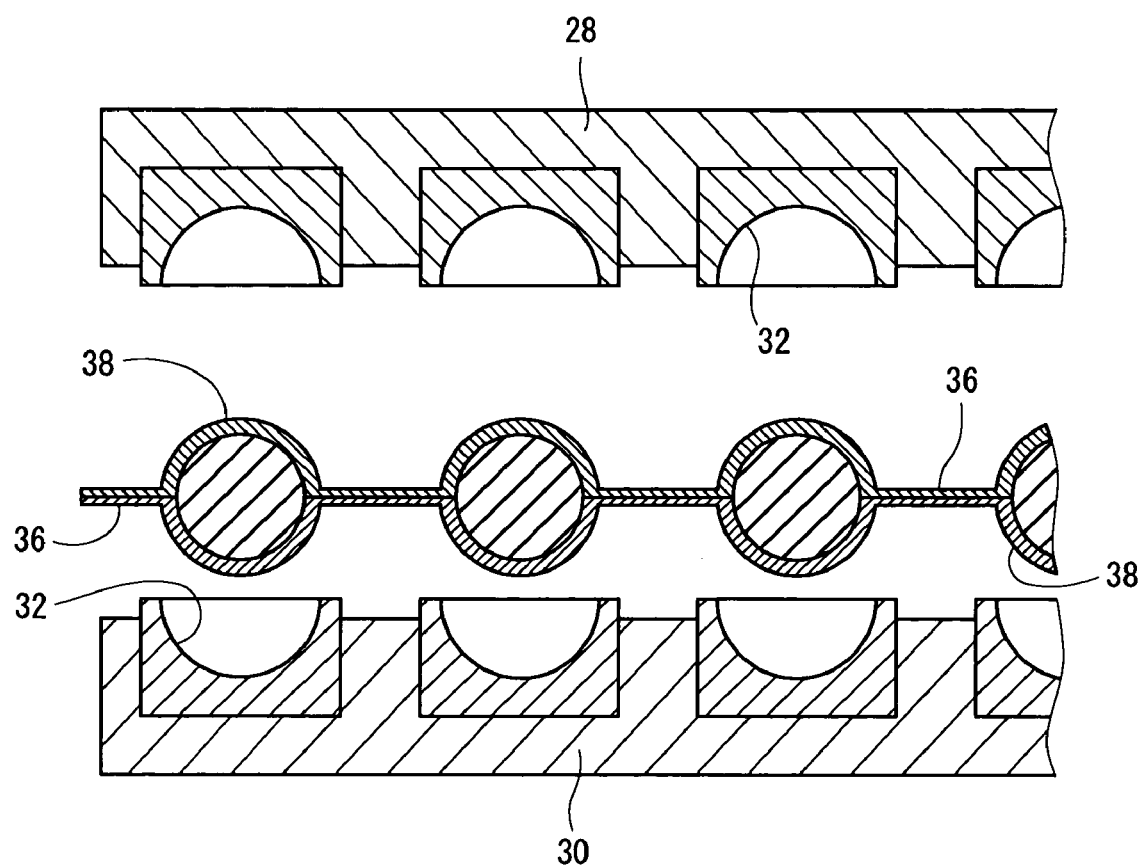
FIG. 3 is a cross-sectional view illustrating a part of the second mold used in the method of the production of the golf ball shown in FIG. 1.

FIG. 3 is a cross sectional view illustrating a part of a second mold 26 for use in the production of the golf ball 2 shown in FIG. 1. The second mold 26 has an upper mold half 28 and a lower mold half 30. Each of the upper mold half 28 and the lower mold half 30 has numerous cavity faces 32, and hemispherical cavities are formed by these cavity faces 32. When the upper mold half 28 and the lower mold half 30 are mated, spherical cavities are formed. Although not shown in the Figure, numerous pimples are formed on the cavity face 32. As described later, dimple 8 is formed owing to this pimple.

Figure 4:
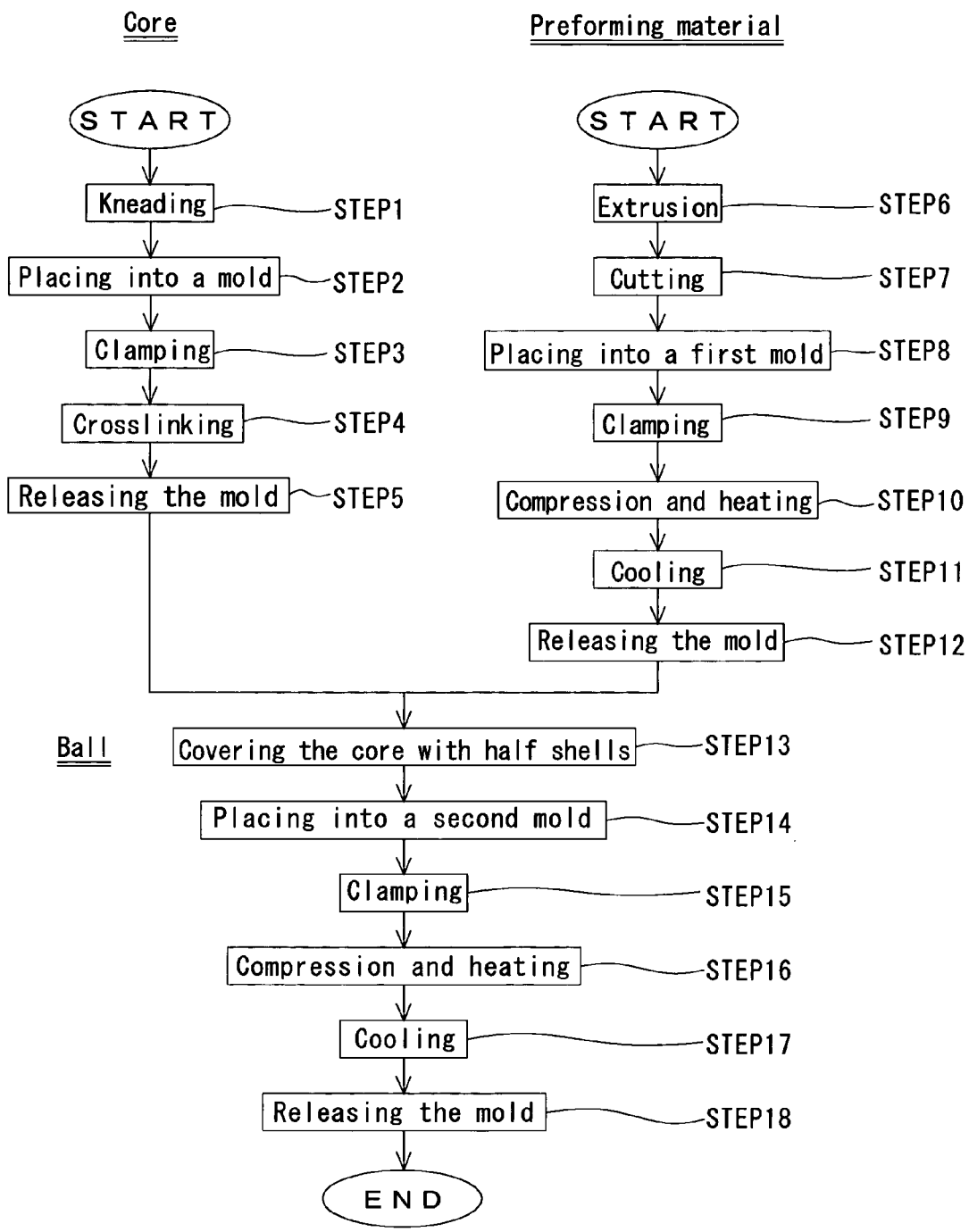
FIG. 4 is a flow diagram illustrating one example of the method of the production of the golf ball shown in FIG. 1.

FIG. 4 is a flow diagram illustrating one example of the method of the production of the golf ball 2 shown in FIG. 1. In this method of the production, a base rubber, a crosslinking agent and various additives are first kneaded to obtain a rubber composition (STEP 1). Next, this rubber composition is placed into a mold having an upper mold half and a lower mold half, and having a spherical cavity (not shown in Figure) (STEP 2). Next, this mold is clamped (STEP 3). Next, the rubber composition is heated via the mold. Heating causes a crosslinking reaction of the rubber (STEP 4). The rubber composition is cured through crosslinking. The mold is released, and a spherical core 4 is removed (STEP 5).

On the other hand, a thermoplastic resin and additives are blended, and extruded from an extruder to give a resin composition (STEP 6). Next, this resin composition is cut into a predetermined size (STEP 7). By thus cutting, pellets 34 are obtained to be a material (see, FIG. 2). Next, the pellet 34 is placed into a first mold 12 (STEP 8). As shown in FIG. 2, the pellet 34 is put on the recessed part 24 of the lower mold half 16. Next, the lower mold half 16 is relatively elevated toward the upper mold half 14, and clamping is carried out (STEP 9). The clamping is usually carried out with a pressing machine. According to the clamping, the pellet 34 is compressed, and heated (STEP 10). The compression and heating results in flow of the resin composition, thereby filling the space between the upper mold half 14 and the lower mold half 16 with the resin composition. Next, the first mold 12 is cooled (STEP 11). By cooling, temperature of the resin composition is also lowered. When the temperature is lowered enough, the first mold 12 is released to remove the preforming material 36 (STEP 12). As shown in FIG. 3, the preforming material 36 has numerous half shells 38. The half shell 38 is bowl-shaped.

Next, as shown in FIG. 3, the core 4 is sandwiched between two pieces of the preforming material 36. The core 4 is covered by two pieces of the half shell 38 (STEP 13). Next, the preforming material 36 and core 4 is placed into a second mold 26 (STEP 14). The preforming material 36 and core 4 is usually put on the cavity face 32 of the lower mold half 30.

Next, the lower mold half 30 is relatively elevated toward the upper mold half 28, and the second mold 26 is clamped (STEP 15). The clamping is usually carried out with a pressing machine. According to the clamping, the half shells 38 are compressed, and heated (STEP 16). The compression and heating results in flow of the resin composition, thereby covering around the core 4. Next, the second mold 26 is cooled (STEP 17). By cooling, temperature of the resin composition is also lowered. When the temperature is lowered enough, the second mold 26 is released, and the golf ball 2 is removed (STEP 18). This golf ball 2 has a cover 6 comprising the resin composition. On the surface of the cover 6 are formed dimples 8 having a shape inverted from the shape of the pimples.

When weight average molecular weight of the pellet 34 is designated as M, and weight average molecular weight of the preforming material 36 is designated as Mp, percent Pp of change in molecular weight of the preforming material 36 can be calculated by the following formula:

$$Pp=((Mp-M)/M)*100.$$

Molding conditions of the preforming material 36 are adjusted to give the percent Pp of equal to or greater than −30%. According to the adjustment in this manner, the cover 6 having a great weight average molecular weight can be obtained. This cover 6 is tough, and is excellent in abrasion resistance and scuff resistance.

In light of the abrasion resistance and scuff resistance, the percent Pp of change in molecular weight is preferably equal to or greater than −20%, and more preferably equal to or greater than −10%. In cases where no cleavage and dissociation of a molecular chain is caused at all, the percent Pp of change in molecular weight is 0%. In cases where chemical binding of the molecules proceeds after completing the production of the golf ball 2, the percent Pp of change in molecular weight may possibly exceed 0%. For example, in a preforming material 36 in which a thermoplastic polyurethane elastomer is used, the percent Pp of change in molecular weight may exceed 0%, in cases where dissociated urethane bond is bound again upon rearrangement of the molecules. Further, in the preforming material 36 in which a thermoplastic polyurethane elastomer and a polymer that can react with an urethane bond such as an isocyanate compound are used in combination, the percent Pp of change in molecular weight may exceed 0%, in cases where an allophanate or burette bond is formed. Upper limit of the percent Pp of change in molecular weight is equal to or greater than 20%, in general.

Weight average molecular weight may be measured by gel permeation chromatography of the soluble content in tetrahydrofuran. Measurement conditions are as shown below.
Machine model: HLC-8120 available from Tosoh Corporation
Column: TSK-GEL SUPER HM-M
Detector: UV-8020U
Solvent: tetrahydrofuran
Amount: 100 µl
Temperature: 40° C.
Flow rate: 0.6 ml/min
Calibration curve: polystyrene As a sample for the measurement, the pellet 34 or the preforming material 36 may be used. Even though multiple kinds of polymers are used in the resin composition, or even though an additive is compounded in the resin composition, the pellet 34 or the preforming material 36 may be directly used as a sample without modification.

In order to obtain the preforming material 36 having a percent Pp of change in molecular weight of equal to or greater than −30%, to avoid the resin composition from being exposed to a high temperature in the molding step is important. By setting the difference (Tp−T) between the molding temperature Tp of the preforming material 36 and the incipient fluidization temperature T of the material to be equal to or less than 70° C., the cover 6 that is excellent in abrasion resistance and scuff resistance can be obtained. In light of the abrasion resistance and scuff resistance, (Tp−T) is more preferably equal to or less than 60° C., more preferably equal to or less than 50° C., and particularly preferably equal to or less than 40° C. When the difference (Tp−T) is too low, fluidization of the resin composition may be inhibited, which may result in difficulty in forming the preforming material 36. In light of the formability, (Tp−T) is preferably equal to or greater than −20° C., and more preferably equal to or greater than −10° C.

The molding temperature Tp means the maximum temperature attained by the surface of the recessed part 24 of the first mold 12 during the time period of from the clamping (STEP 9) to the releasing of the mold (STEP 12). The incipient fluidization temperature T may be measured by "FLOW-STER CFT-500", available from Shimadzu Corporation. Measurement conditions are as shown below.
Plunger area: 1 cm$^2$
DIE LENGTH: 1 mm
DIE DIA: 1 mm
Load: 588.399 N
Initiation temperature: 30° C.
Temperature elevation rate: 3° C./min As a sample for the measurement, the pellet 34 may be used.

In light of suppression of cleavage and dissociation of a molecular chain, molding time period of the preforming material 36 is preferably equal to or less than 30 minutes, more preferably equal to or less than 20 minutes, still more preferably equal to or less than 10 minutes, and particularly preferably equal to or less than 5 minutes. In light of achieving sufficient flow of the resin composition, the molding time period is preferably equal to or greater than 1 minute, and particularly preferably equal to or greater than 2 minutes. The molding time period refers to a time period starting from clamping (STEP 9) to releasing of the mold (STEP 12).

In light of possible achievement of low molding temperature Tp, it is preferred to use a material having an incipient fluidization temperature T of equal to or less than 150° C., still more, equal to or less than 140° C., and particularly equal to or less than 135° C. The incipient fluidization temperature T in cases where a generally obtained thermoplastic resin is used is equal to or greater than 50° C.

As shown in FIG. 2, one pellet 34 is placed in one recessed part 24 in the step of placing (STEP 8). Although two or more pellets 34 may be placed in one recessed part 24, seam of the pellets 34 may be formed in the half shell 38 in such a case. The seam is also referred to as weld line. The weld line is a peculiar part. According to the present invention, because the molding temperature Tp is set to be low, the weld line could deteriorate the durability of the cover 6. In light of the durability, it is preferred that number of the pellet 34 to be placed into one recessed part 24 is one. By setting the weight of the pellet 34 to be 1.4 g or greater and 2.0 g or less, one half shell 38 can be obtained with one pellet 34. When number of the pellet 34 placed into one recessed part 24 is one, operation in the step of placing (STEP 8) may be facilitated.

Although the preforming material 36 may be formed by injection molding, compression molding is more preferred in comparison with injection molding for the reasons described below. First, the melted resin composition is allowed to flow at high rate and over long distance in injection molding, therefore, the resin composition is required to have a low viscosity. In other words, it is required to elevate the temperature of the resin composition. When the resin composition is exposed to a high temperature, cleavage and dissociation of a molecular chain of the polymer may be promoted. Second, in the injection molding, the resin composition is allowed to stand in the cylinder of the injection molding machine in an atmosphere of high temperature for a long period of time. In particular, when the preforming material 36 is thin, amount of discharge from the injection molding machine per one shot is small, therefore, the time of allowing to stand becomes extremely long. During this time period of allowing to stand, cleavage and dissociation of a molecular chain of the polymer may proceed. Third, during the injection molding, the resin composition passes through the screw of the injection molding machine, and the runner and gate of the mold, and goes ahead along a narrow space in the cavity. Accordingly, orientation of the polymer becomes prominent. This orientation deteriorates the scuff resistance of the cover 6. For the reasons described above, compression molding is more preferred than injection molding for the molding of the preforming material 36.

When the injection molding is employed, maximum temperature attained by the resin composition during the time period of from the placing of the pellet 34 into the cylinder of the injection molding machine to completion of the molding is referred to as molding temperature Tp. When the injection molding is employed, time period of from the placing of the pellet 34 into the cylinder of the injection molding machine to the injection of the resin composition into the cavity of the mold is referred to as molding time period. In light of the formability, (Tp−T) is preferably equal to or greater than −20° C., more preferably equal to or greater than −10° C., and particularly preferably equal to or greater than 0° C., in case of the injection molding.

When the weight average molecular weight of the pellet 34 is designated as M, and the weight average molecular weight of the cover 6 is designated as Mc, percent Pc of change in molecular weight of the cover 6 is calculated by the following formula:

$$Pc=((Mc-M)/M)*100.$$

Molding conditions of the cover 6 are adjusted to give the percent Pc of equal to or greater than −30%. According to the adjustment in this manner, the cover 6 having a great weight average molecular weight can be obtained. This cover 6 is tough, and is excellent in abrasion resistance and scuff resistance.

In light of the abrasion resistance and scuff resistance, the percent Pc of change in molecular weight is preferably equal to or greater than −20%, and more preferably equal to or greater than −10%. In cases where no cleavage and dissociation of a molecular chain is caused at all in the step of molding the preforming material 36 and in the step of forming the cover 6, the percent Pc of change in molecular weight is 0%. In cases where chemical binding of the molecules proceeds after completing the production of the preforming material 36 or after completing the production of the golf ball 2, the percent Pc of change in molecular weight may possibly exceed 0%. For example, in a cover 6 in which a thermoplastic polyurethane elastomer is used, the percent Pc of change in molecular weight may exceed 0%, in cases where dissociated urethane bond is bound again upon rearrangement of the molecules. Further, in the cover 6 in which a thermoplastic polyurethane elastomer and a polymer that can react with an urethane bond such as an isocyanate compound are used in combination, the percent Pc of change in molecular weight may exceed 0%, in cases where an allophanate or burette bond is formed. Upper limit of the percent Pc of change in molecular weight is equal to or greater than 20%, in general.

Weight average molecular weight Mc of the cover 6 may be measured by a similar method as that for the measurement of the weight average molecular weight Mp of the preforming material 36 described above. Sample for the measurement is cut away from the cover 6. Even though multiple kinds of polymers are used in the resin composition, or even though an additive is compounded in the resin composition, the cover 6 is directly used as a sample without modification.

In order to obtain the cover 6 having a percent Pc of change in molecular weight of equal to or greater than −30%, to avoid the resin composition from being exposed to a high temperature in the molding step is important. By setting the difference (Tc−T) between the molding temperature Tc the cover 6 and the incipient fluidization temperature T of the material to be equal to or less than 70° C., the cover 6 that is excellent in abrasion resistance and scuff resistance can be obtained. In light of the abrasion resistance and scuff resistance, (Tc−T) is more preferably equal to or less than 60° C., more preferably equal to or less than 50° C., and particularly preferably equal to or less than 40° C. When the difference (Tc−T) is too low, fluidization of the resin composition may be inhibited, which may result in difficulty in forming the cover 6. In light of the formability, (Tc−T) is preferably equal to or greater than −20° C., and more preferably equal to or greater than −10° C.

The molding temperature Tc means the maximum temperature attained by the cavity face 32 of the second mold 26 during the time period of from the clamping (STEP 15) to the releasing of the mold (STEP 18).

In light of suppression of cleavage and dissociation of a molecular chain, molding time period of the cover 6 is preferably equal to or less than 30 minutes, more preferably equal to or less than 20 minutes, still more preferably equal to or less than 10 minutes, and particularly preferably equal to or less than 5 minutes. In light of achieving sufficient flow of the resin composition, the molding time period is preferably equal to or greater than 1 minute, and particularly preferably equal to or greater than 2 minutes. The molding time period refers to a time period starting from clamping (STEP 15) to releasing of the mold (STEP 18).

In light of possible achievement of low molding temperature Tc, it is preferred to use a material having an incipient fluidization temperature T of equal to or less than 150° C., still more, equal to or less than 140° C., and particularly equal to or less than 135° C. The incipient fluidization temperature T in cases where a generally obtained thermoplastic resin is used is equal to or greater than 50° C.

The cover 6 may be also formed by injection molding. When injection molding is employed, the preforming material 36 is not formed. In light of the formability, (Tc−T) is preferably equal to or greater than −20° C., more preferably equal to or greater than −10° C., and particularly preferably equal to or greater than 0° C., in cases of the injection molding. For similar reasons to the instance of the preforming material 36, compression molding is more preferred in comparison with injection molding for forming the cover 6.

The method of the production shown in FIG. 4 is suitable for a golf ball 2 which comprises a cover 6 having a thickness of equal to or less than 1.0 mm, particularly equal to or less than 0.6 mm, and still more, equal to or less than 0.5 mm. This method of the production is suitable for a golf ball 2 having a cover 6 which comprises a thermoplastic polyurethane elastomer as a principal component.

EXAMPLES

Example 1

A rubber composition was obtained by kneading 100 parts by weight of polybutadiene (trade name "BR-730", available from JSR Corporation), 37 parts by weight of zinc diacrylate, an appropriate amount of zinc oxide, 0.7 part by weight of bis(pentabromophenyl)disulfide and 0.9 part by weight of dicumyl peroxide. This rubber composition was placed into a mold having upper and lower mold half each having a hemispherical cavity, and heated under a temperature of 170° C. for 15 minutes to obtain a center having a diameter of 38.5 mm. This center had a weight of 34.9 g.

A resin composition was obtained by kneading 50 parts by weight of an ionomer resin (trade name "Himilan 1605", available from Du Pont-MITSUI POLYCHEMICALS Co., Ltd.) and 50 parts by weight of other ionomer resin (trade name "Surlyn® 9945", available from Dupont) in a biaxial extruder. This resin composition was rendered to cover around the center by injection molding to obtain a core having a diameter of 41.7 mm.

A resin composition was obtained by kneading 100 parts by weight of a thermoplastic polyurethane elastomer (trade name "Elastolan XNY97A", available from BASF Japan Ltd.), 4 parts by weight of titanium dioxide and 0.1 part by weight of ultramarine blue in a biaxial extruder. This resin composition was cut to give pellets having a weight of 1.7 g. This pellet had a weight average molecular weight M of 100000. This pellet had an incipient fluidization temperature T of 135° C.

Each one piece of this pellet was placed into every recessed part of a first mold, and a preforming material having numerous half shells was obtained by compression molding. The molding temperature was 165° C., and the molding time period was 3 minutes, with a molding pressure of 30 kgf/cm². This preforming material had a weight average molecular weight Mp of 90000. This preforming material has a percent Pp of change in molecular weight of −10.0%.

The aforementioned core was sandwiched between two pieces of the preforming material, placed into a second mold to obtain a cover by compression molding. The molding temperature was 140° C., and the molding time period was 3 minutes, with a molding pressure of 100 kgf/cm². This cover had a weight average molecular weight Mc of 89000. This cover has a percent Pc of change in molecular weight of −11.0%. This cover had a thickness of 0.5 mm. Painting was applied on the surface of this cover to obtain a golf ball.

Examples 2 and 3

In a similar manner to Example 1 except that molding conditions of the preforming material are as shown in Table 1 below, a golf ball was obtained.

Comparative Example 1

In a similar manner to Example 1 except that molding conditions of the preforming material and molding conditions of the cover are as shown in Table 1 below, a golf ball was obtained.

Example 4

In a similar manner to Example 1 except that trade name "Elastolan XNY90A", available from BASF Japan Ltd., was used as a thermoplastic polyurethane elastomer, and that molding conditions of the preforming material and the cover are as shown in Table 2 below, a golf ball was obtained.

Example 5

In a similar manner to Example 1 except that the preforming material was formed by injection molding, a golf ball was obtained.

Example 6 and Comparative Example 2

In a similar manner to Example 1 except that the preforming material was not formed, and that the cover was formed by injection molding, a golf ball was obtained.

[Measurement of Abrasion Loss]

A disc-shaped test piece having a diameter of 5 mm was punched out from the cover, and abrasion loss when the abrasion distance is 20 m was measured according to a rule of DIN abrasion test in "JIS K 6264". In this test, inside face of the cover was pressed against an abrasive cloth. The results are presented in Table 1 and Table 2 below.

[Evaluation of Scuff Resistance Performance]

A pitching wedge was attached to a swing machine available from Golf Laboratory Co. Then the machine condition was set to give the head speed of 36 m/sec, and the golf balls were hit therewith. Accordingly, extent of scratch on the surface of the golf ball after hitting was visually observed, and the result was rated into three ranks of from "A" to "C" based on the following criteria:

A: slight scratch caused on the surface;
B: the surface slightly scraped, and scuffing caused; and
C: the surface considerably scraped, and scuffing being remarkable.

The results are presented in Table 1 and Table 2 below.

TABLE 1

| | | Results of evaluation | | | |
|---|---|---|---|---|---|
| | | Example 1 | Example 2 | Example 3 | Comparative example 1 |
| Composition (part by weight) | Elastolan XNY97A | 100 | 100 | 100 | 100 |
| | Elastolan XNY90A | — | — | — | — |
| | Titanium dioxide | 4 | 4 | 4 | 4 |
| | Ultramarine blue | 0.1 | 0.1 | 0.1 | 0.1 |
| Pellet | Weight average molecular weight M | 100000 | 100000 | 100000 | 100000 |
| | Incipient fluidization temperature T (° C.) | 135 | 135 | 135 | 135 |
| | Weight per one pellet (g) | 1.7 | 1.7 | 1.7 | 1.7 |

TABLE 1-continued

Results of evaluation

|  |  | Example 1 | Example 2 | Example 3 | Comparative example 1 |
|---|---|---|---|---|---|
| Preforming material | Molding method | Compression | Compression | Compression | Compression |
|  | Molding temperature Tp (° C.) | 165 | 145 | 125 | 230 |
|  | Tp-T (° C.) | 30 | 10 | −10 | 95 |
|  | Molding time period (min) | 3 | 10 | 20 | 3 |
|  | Molding compression (kgf/cm$^2$) | 30 | 30 | 30 | 30 |
|  | Weight average molecular weight Mp | 90000 | 95000 | 98000 | 45000 |
|  | Rate of change in molecular weight Pp (%) | −10.0 | −5.0 | −2.0 | −55.0 |
| Cover | Molding method | Compression | Compression | Compression | Compression |
|  | Molding temperature Tc (° C.) | 140 | 140 | 140 | 160 |
|  | Tc-T (° C.) | 5 | 5 | 5 | 25 |
|  | Molding time period (min) | 3 | 3 | 3 | 3 |
|  | Molding compression (kgf/cm$^2$) | 100 | 100 | 100 | 100 |
|  | Weight average molecular weight Mc | 89000 | 94000 | 95000 | 42000 |
|  | Rate of change in molecular weight Pc (%) | −11.0 | −6.0 | −5.0 | −58.0 |
|  | Thickness (mm) | 0.5 | 0.5 | 0.5 | 0.5 |
|  | Hardness (Shore D) | 47 | 47 | 47 | 47 |
| Abrasion loss (mm$^3$) |  | 10 | 10 | 10 | 40 |
| Scuff resistance |  | A | A | A | C |

TABLE 2

Results of evaluation

|  |  | Example 4 | Example 5 | Example 6 | Comparative example 2 |
|---|---|---|---|---|---|
| Composition (part by weight) | Elastolan XNY97A | — | 100 | 100 | 100 |
|  | Elastolan XNY90A | 100 | — | — | — |
|  | Titanium dioxide | 4 | 4 | 4 | 4 |
|  | Ultramarine blue | 0.1 | 0.1 | 0.1 | 0.1 |
| Pellet | Weight average molecular weight M | 110000 | 100000 | 100000 | 100000 |
|  | Incipient fluidization temperature T (° C.) | 140 | 135 | 135 | 135 |
|  | Weight per one pellet (g) | 1.7 | 1.7 | 1.7 | 1.7 |
| Preforming material | Molding method | Compression | Injection | Not formed | Not formed |
|  | Molding temperature Tp (° C.) | 170 | 200 |  |  |
|  | Tp-T (° C.) | 30 | 65 |  |  |
|  | Molding time period (min) | 3 | 5 |  |  |
|  | Molding compression (kgf/cm$^2$) | 30 | 90 |  |  |
|  | Weight average molecular weight Mp | 91000 | 7900 |  |  |
|  | Rate of change in molecular weight Pp (%) | −17.3 | −21.0 |  |  |
| Cover | Molding method | Compression | Compression | Injection | Injection |
|  | Molding temperature Tc (° C.) | 140 | 140 | 200 | 230 |
|  | Tc-T (° C.) | 0 | 5 | 65 | 95 |
|  | Molding time period (min) | 3 | 3 | 5 | 5 |
|  | Molding compression (kgf/cm$^2$) | 100 | 100 | 90 | 90 |
|  | Weight average molecular weight Mc | 85000 | 75000 | 76000 | 35000 |
|  | Rate of change in molecular weight Pc (%) | −22.7 | −25.0 | −24.0 | −65.0 |
|  | Thickness (mm) | 0.5 | 0.5 | 0.5 | 0.5 |
|  | Hardness (Shore D) | 42 | 47 | 47 | 47 |
| Abrasion loss (mm$^3$) |  | 10 | 15 | 15 | 50 |
| Scuff resistance |  | A | A | B | C |

As shown in Table 1 and Table 2, the golf ball obtained by the method of the production of Examples is excellent in abrasion resistance and scuff resistance. Accordingly, advantages of the present invention are clearly indicated by these results of evaluation.

The method of the production according to the present invention is also suited for molding of the inner cover and outer cover of a golf ball having a two-layered cover. In other words, inner covers also fall within the concept of the "cover" referred to herein. The description herein above is merely for illustrative examples, and various modifications can be made without departing from the principles of the present invention.

What is claimed is:

1. A method of the production of a golf ball which comprises:
   preparing a resin composition comprising a thermoplastic resin as a base polymer to obtain a first material; and
   covering around a spherical core with said resin composition while allowing said resin composition to flow in a mold to form a cover having a percent Pc of change in molecular weight with respect to the first material of equal to or greater than −30%.

2. The method of the production according to claim 1, wherein said material has an incipient fluidization temperature of 50° C. or greater and 150° C. or less.

3. The method of the production according to claim 1, wherein said cover is formed by compression molding, with the molding temperature falling within the range of −20° C. or greater and +70° C. or less than the incipient fluidization temperature of the material, and with the molding time period of the compression molding being 1 minute or longer and 30 minutes or less.

4. A method of the production of a golf ball which comprises:
   preparing a resin composition comprising a thermoplastic resin as a base polymer to obtain a first material;
   forming a preforming material having a percent Pp of change in molecular weight with respect to the first material of equal to or greater than −30%, while allowing said resin composition to flow in a first mold;
   placing said preforming material and a spherical core into a second mold; and
   covering around the core with said resin composition while allowing the resin composition of said preforming material to flow in the second mold to form a cover.

5. The method of the production according to claim 4, wherein said material has an incipient fluidization temperature of 50° C. or greater and 150° C. or less.

6. The method of the production according to claim 4, wherein said preforming material is formed by compression molding, with the molding temperature falling within the range of −20° C. or greater and +70° C. or less than the incipient fluidization temperature of the material, and with the molding time period of the compression molding being 1 minute or longer and 30 minutes or less.

7. The method of the production according to claim 6, wherein said material is in a pellet form, and one pellet has a weight of 1.4 g or greater and 2.0 g or less.

8. The method of the production according to claim 4, wherein said cover has a percent Pc of change in molecular weight with respect to the first material of equal to or greater than −30%.

9. The method of production according to claim 1, wherein the percent Pc is equal to or greater than −20%.

10. The method of production according to claim 1, wherein the percent Pc is equal to or greater than −10%.

11. The method of production according to claim 4, wherein the percent Pp is equal to or greater than −20%.

12. The method of production according to claim 4, wherein the percent Pp is equal to or greater than −10%.

13. The method of the production according to claim 2, wherein said material has an incipient fluidization temperature of 50° C. or greater and 140° C. or less.

14. The method of the production according to claim 2, wherein said material has an incipient fluidization temperature of 50° C. or greater and 135° C. or less.

15. The method of the production according to claim 5, wherein said material has an incipient fluidization temperature of 50° C. or greater and 140° C. or less.

16. The method of the production according to claim 5, wherein said material has an incipient fluidization temperature of 50° C. or greater and 135° C. or less.

* * * * *

UNITED STATES PATENT AND TRADEMARK OFFICE
CERTIFICATE OF CORRECTION

PATENT NO. : 7,622,065 B2
APPLICATION NO. : 11/157808
DATED : November 24, 2009
INVENTOR(S) : Fujisawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Fourteenth Day of December, 2010

David J. Kappos
*Director of the United States Patent and Trademark Office*